Dec. 27, 1966  E. R. PLEDGER ETAL  3,295,044
ELECTRICAL CONTROL APPARATUS FOR INVERTER SYSTEMS
Filed July 18, 1963  7 Sheets-Sheet 2

United States Patent Office 3,295,044
Patented Dec. 27, 1966

3,295,044
ELECTRICAL CONTROL APPARATUS FOR INVERTER SYSTEMS
Eugene R. Pledger, Churchill Boro, and Frank J. Prines, Penn Hills, Pa., assignors to Westinghouse Electric Corporation, Pittsburgh, Pa., a corporation of Pennsylvania
Filed July 18, 1963, Ser. No. 296,033
8 Claims. (Cl. 321—5)

This invention relates in general to inverter systems and more particularly to control apparatus for regulating the electrical output quantities of inverter systems.

One of the more desirable system concepts for converting a unidirectional potential to a three-phase alternating potential involves the generation of two-phase alternating potential and then connecting the output trasformers of the two phases in the well known Scott-T arrangement to obtain the desired three-phase alternating potential. Two inverter circuits are utilized in the inverter system, which may be called the main and teaser inverters, with the teaser inverter producing an alternating potential having a phase in quadrature with the phase of the alternating potential produced in the main inverter. In other words, the voltage output of the teaser inverter lags the voltage output of the main inverter by a phase angle of ninety degrees. By filtering the square wave output voltages of the main and teaser inverters to obtain voltages having a sine wave configuration, and applying these sine wave voltages to the Scott-T connected output transformers of the main and teaser inverters, the desired three-phase potential may be obtained. The alternating potential of the main inverter is applied across the primary winding of the main output transformer of the Scott-T arrangement, and the alternating potential output of the teaser inverter is applied across the primary winding of the teaser transformer. The secondary winding of the teaser transformer is connected to the electrical center of the secondary winding of the main transformer, and the teaser transformer is selected to provide a secondary potential that is equal to .866 the potential produced by the secondary winding of the main transformer. Thus, with the secondary potential of the teaser transformer being equal in magnitude to .866 of the secondary potential of the main transformer, and the two potentials being out of phase by ninety electrical degrees, a three-phase potential is produced that has three potentials of equal magnitude, and these three potentials are one hundred and twenty electrical degrees out of phase with each other. Conventional closed loop regulating systems may be used to regulate the output potential of each inverter and maintain the .866 relationship between them. The voltage across the secondary winding of the main transformer, which may be called $V_M$, is one of the line voltages of the three-phase output, and the remaining two line voltages are each determined by the vector sum of .5 $V_M$ and .866 $V_M$, which vector sum is equal to $V_M$.

This system, however, has certain disadvantages when used with apparatus which requires very close voltage regulation and substantially no phase voltage unbalance under unbalanced load conditions. For example, unequal voltages and unequal phase angles between the three output voltages, which for convenience may be termed an unsymmetrical output, may be caused by unequal phase shifts occurring in the main and teaser filter networks which transform the square wave output voltage of the inverters to a sine wave. This condition may be present under load or at no load, and is aggravated by unbalanced load conditions because one filter may supply more power than the other.

Another cause of unsymmetrical inverter output may be due to the fact that although the primary voltages of the main and teaser transformers may be in quadrature, the secondary voltages may not be in quadrature due to phase changes in the transformers themselves.

Another cause of unsymmetrical inverter output may be due to the voltage regulation of the voltage output of the main inverter. As hereinbefore stated, the secondary winding of the main transformer of the Scott-T arrangement is divided into two equal electrical parts of the connection of the secondary winding of the teaser transformer. If the portion of the phase between one end of the secondary winding of the main transformer and the secondary winding of the teaser transformer is more heavily loaded than the portion of the phase between the remaining end of the secondary winding of the main transformer and the secondary winding of the teaser transformer, a larger voltage or IZ drop occurs across one-half of the secondary winding of the main transformer than the other. Since the voltage regulator only regulates the total voltage across the secondary winding of the main transformer, the total voltage may not be divided equally between the two sections. Thus, the hypotenuse voltages, or the line voltages produced by the vector sum of the voltage across each half of the secondary winding of the main transformer and the voltage across the secondary winding of the teaser transformer, may not be equal when the secondary voltages of the main and teaser transformers are held in quadrature.

The phase angle at which the voltage output of the teaser inverter differs from the voltage output of the main inverter may be controlled by varying the switching point in time of the teaser inverter with respect to the main inverter. Controlling this phase angle would control the angle between the secondary voltages of the main and teaser transformers and an error signal could be generated when this angle is not ninety degrees. This error signal could be applied to a continuous closed loop feedback regulator which could advance or retard the switching point in time of the teaser inverter. This would allow the phase of the output voltage of the teaser inverter to vary with respect to the main inverter, compensating for phase shifts occurring in the later stages of the system and, therefore, maintaining the secondary voltages of the main and teaser transformers in quadrature. This would result in symmetrical output when the load is balanced. However, as hereinbefore stated, maintaining the secondary voltages of the main and teaser transformers in quadrature under unbalanced load conditions, produces an unsymmetrical output. It is, therefore, desirable to provide control apparatus for an inverter system that will produce a symmetrical output under unbalanced load conditions as well as balanced load conditions.

Accordingly, it is an object of this invention to provide a new and improved regulating system.

Another object of this invention is to provide a new and improved regulating system for inverter apparatus.

A further object of this invention is to provide a new and improved regulating system for inverter apparatus that insures a symmetrical polyphase output.

Another object of this invention is to provide a new and improved regulating system for inverter apparatus that insures symmetrical polyphase output potentials under balanced or unbalanced load conditions.

Another object of this invention is to provide a new and improved regulating system for inverter apparatus that insures symmetrical polyphase output potentials when unequal phase shifts occur in the filter networks and output transformers of the inverter apparatus.

A further object of this invention is to provide new and improved regulator apparatus that insures symmetrical three-phase output potentials from an inverter system which first produces two alternating potential phase voltages and then transforms the two alternating potential phase voltages into a three-phase line voltage.

Briefly, the present invention accomplishes the above cited objects by providing a new and improved regulating system which, in addition to the conventional closed loop regulators for regulating the voltage magnitudes produced by the secondary windings of the main and teaser transformers, regulates the phase angle between the secondary voltages of the main and teaser transformers such that the two phase voltages derived by the vector sum of the voltages between the two halves of the secondary winding of the main transformer and the secondary winding of the teaser transformer, hereinafter called the hypotenuse voltages, are equal. This is accomplished by producing an error signal proportional to the difference in magnitude of the two hypotenuse voltages and using this error signal to increase or decrease the phase angle between the output potentials of the main and teaser inverters. In order to prevent the condition of having the hypotenuse voltages being equal to each other but not equal to the third phase voltage produced across the entire secondary winding of the main transformer, which could happen under unbalanced load conditions if the magnitudes of the secondary voltages of the main and teaser transformers are both sensed directly by their respective voltage regulators, the voltage regulator which ordinarily would sense the secondary voltage of the teaser transformer directly and regulate it to 0.866 of the secondary voltage of the main transformer is arranged to sense one of the hypotenuse voltages. This regulator then controls the secondary voltage of the teaser transformer so that the hypotenuse voltage sensed is equal to the secondary voltage of the main transformer. An equilateral triangle is thus produced by the three output voltages, which insures a symmetrical output, since the hypotenuse voltages are made equal to each other by the phase angle regulator, and the third line voltage, being the voltage across the secondary winding of the main transformer, is regulated to be equal to one of the hypotenuse voltages. In other words, the inverter output is controlled by three regulators, with one regulator controlling the magnitude of the secondary voltage of the main inverter transformer, which voltage we will call line voltage A. The second regulator controls the magnitude of the secondary voltage of the teaser inverter transformer by making one of the hypotenuse voltages, which we will call line voltage B, equal to the voltage of line voltage A. A third regulator, which has a slower response time than the first two regulators to prevent interaction, regulates the phase angle between the output voltages of the main and teaser inverters so that the hypotenuse voltage or line voltage $V_B$ is equal to the remaining hypotenuse voltage, which we will call line voltage $V_C$. Therefore, all three line voltages $V_A$, $V_B$ and $V_C$, are equal in magnitude forming an equilateral triangle and assuring that the inverter system has a symmetrical three-phase output voltage.

Further objects and advantages of the invention will become apparent as the following description proceeds and features of novelty which characterize the invention will be pointed out in particularity in the claims annexed to and forming a part of this specification.

For a better understanding of the invention, reference may be had to the accompanying drawings, in which.

Figure 1:
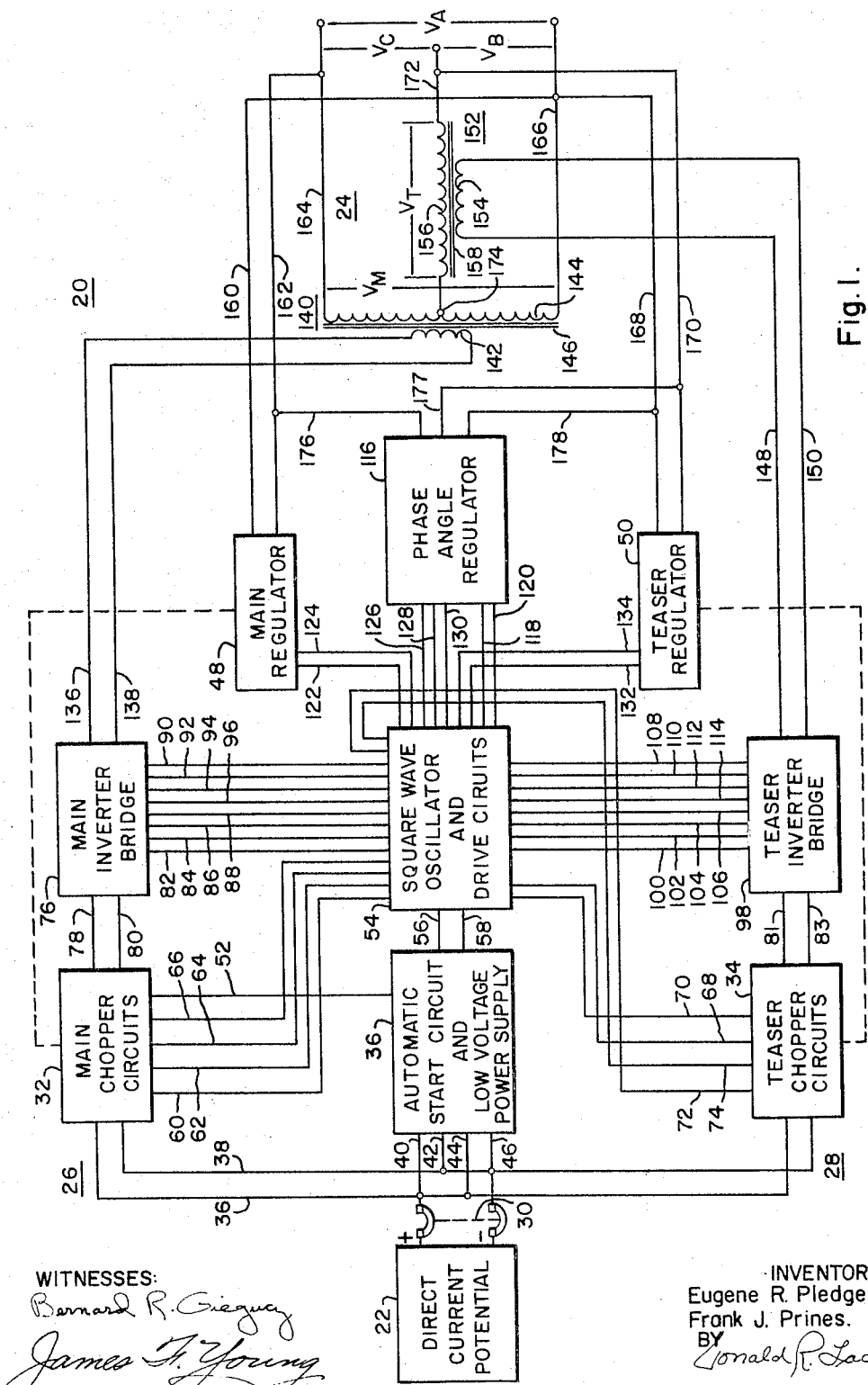
FIGURE 1 is a block diagram illustrating a complete polyphase inverter system utilizing a main and teaser inverter having their output transformers connected in Scott-T arrangement to produce a three-phase output potential.

Referring now to the drawings, and FIG. 1 in particular, ther is shown a block diagram illustrating an inverter system 20 which produces two alternating potential phases from a unidirectional or direct current potential source 22 and converts the two-phase voltages into a three-phase line voltage in transformer arrangement 24. More specifically, inverter system 20 comprises two inverter circuits, which will be termed the main inverter 26 and teaser inverter 28. When circuit interrupting device 30 is closed, a unidirectional potential is applied to the main chopper circuit 32 and teaser chopper circuit 34 through conductors 36 and 38, and to the automatic start circuit and low voltage power supply 36 through conductors 40, 42, 44 and 46. The function of the main and teaser chopper circuits, 32 and 34 respectively, is to provide a unidirectional voltage of the proper magnitude by switching the source voltage on and off and filtering the result to obtain an average unidirectional potential of the proper magnitude. The main and teaser chopper circuits 32 and 34 are controlled by the main and teaser regulator circuits, 48 and 50 respectively, as will be hereinafter explained. When the unidirectional potential is applied to the main and teaser chopper circuits, 32 and 34, the filter capacitors in said circuits are allowed to charge. When the capacitors in the main chopper circuits 32 have reached a predetermined charge, the automatic start circuit and low voltage power supply 36 is signaled through conductor 52 and a unidirectional voltage is applied to the square wave oscillator and drive circuits 54 through conductors 56 and 58.

Square wave oscillator and drive circuits 54 include the magnetic amplifiers, saturable reactors, and saturating transformers necessary to control the turning on and off of the main and teaser chopper circuits 32 and 34, with conductors 60 and 62 controlling when the main chopper circuit 32 allows conduction in response to intelligence from main regulator 48, and conductors 64 and 66 stop the conduction of the main chopper circuit 32 at a fixed time.

In like manner, conductors 68 and 70 control the starting time of teaser chopper circuit 34, in response to intelligence from teaser regulator 50, and conductors 72 and 74 stop the conduction of teaser chopper circuit 34 at a fixed time. The average unidirectional voltage produced by the main chopper circuits 32 is applied to the main inverter bridge 76 through conductors 78 and 80, and the average unidirectional voltage produced by the teaser chopper circuits 34 is applied to teaser inverter bridge 98 through conductors 81 and 83.

The conduction of the main inverter bridge 76 is in accordance with signals received from the square wave oscillator and drive circuits 54, through conductors 82, 84, 86, 88, 90, 92, 94 and 96. In like manner the conduction of the teaser inverter bridge 98 is in accordance with the signals received from the square wave oscillator and drive circuits 54, through conductors 100, 102, 104, 106, 108, 110, 112 and 114. The phase angle between the output voltages of the main inverter bridge 76 and the teaser inverter bridge 98 is determined by the phase angle regulator 116, with the phase angle regulator intelligence being applied to the square wave oscillator and drive circuits 54 through conductors 118 and 120.

The square wave oscillator and drive circuits 54 also provides a potential for the operation of the main, teaser, and phase angle regulators 48, 50 and 116, respectively, through conductors 122, 124, 126, 128, 130 132 and 134.

The output voltage of the main inverter bridge 76 is applied through conductors 136 and 138 to main output transformer 140, which includes primary and secondary windings 142 and 144, respectively, inductively disposed on magnetic core 146. The output voltage of the teaser inverter bridge 98 is applied through conductors 148 and 150 to teaser output transformer 152, which includes primary and secondary windings 154 and 156, respectively, inductively disposed on magnetic core 158.

In order to monitor and regulate the output voltage $V_M$ of main transformer 140, conductors 160 and 162 are connected from the main regulator 48 to output conductors 164 and 166. In order to monitor and regulate the output voltage $V_T$ of teaser transformer 152, conductors 168 and 170 are connected from the teaser regulator 50 to line conductors 166 and 172. The voltage $V_T$ is monitored indirectly, as shown, instead of directly across the secondary winding 156, for reasons that will be hereinafter explained. In order to monitor the vector produced line voltages $V_C$ and $V_B$ and regulate the phase angle between voltages $V_M$ and $V_T$ so that line voltage $V_C$ is equal to line voltage $V_B$, conductors 176, 177 and 178 are connected from phase angle regulator 116 to conductors 162, 168 and 170.

Figure 2:
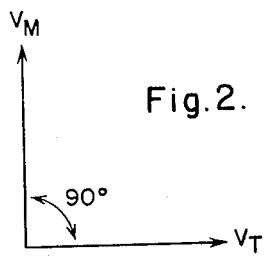
FIGS. 2, 3 and 4 are vector diagrams explanatory of the operation of the inverter system shown in FIG. 1.
Figure 4:
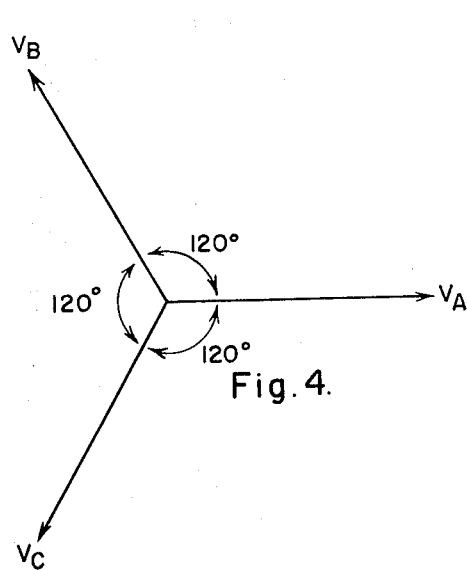
Figure 3:
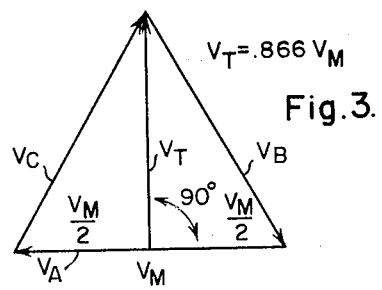

In order to produce a three-phase line voltage from the two phase voltages $V_M$ and $V_T$, the secondary winding 156 of teaser transformer 152 is connected to the electrical center 174 on secondary winding 144 of main transformer 140, thus forming the familiar Scott-T transformer connection. Under ideal conditions, such as a balanced three-phase load, and equal phase shifts occurring in the filter networks and output transformers, a symmetrical three-phase output voltage may be obtained by the transformer arrangement 24 by regulating the magnitude of the secondary voltage $V_T$ of teaser transformer 152 to be equal to .866 of the magnitude of the secondary voltage $V_M$ of the transformer 140, and by maintaining the phase relationship between voltages $V_M$ and $V_T$ such that the voltage $V_T$ lags voltage $V_M$ by ninety electrical degrees. This is shown in FIG. 2. It can be seen from FIG. 3, that the hypotenuse voltages $V_B$ and $V_C$, formed by the vector sum of voltages $.5\ V_M$ and $V_T$, with $V_T$ being equal to $.866\ V_M$, will be equal to the voltage $V_M$. The secondary voltage $V_M$ of main transformer 140 is also one of the line voltages $V_A$, so line voltages $V_A$, $V_B$ and $V_C$ are all equal in magnitude and one hundred and twenty degrees out of phase, as shown in FIG. 4.

Ideal conditions, however, do not exist, with unequal phase shifts occurring in the main and teaser output transformers 140 and 152 and in the main and teaser filter networks which transform the square wave output of the main and teaser inverter bridges, 76 and 98, to a sine wave. Further, any unbalance in the three-phase load aggravates the phase shift condition. Also, an unbalanced load may cause an unsymmetrical output voltage due to the fact that the main voltage regulator 48 regulates the total output voltage $V_M$ of the main ouput transformer 140 and not each half of the output voltage $V_M$. Unequal loading may, therefore, cause the condition where $V_M$ is held constant but due to different voltage drops occurring across each half of the secondary winding 144 of main transformer 140, the voltage $V_M$ may be divided unequally on each side of the center tap, resulting in unequal hypotenuse voltages $V_B$ and $V_C$.

The invention provides a regulating and controlling system whereby unsymmetrical output voltages caused by phase shifts in the filter networks, phase shifts in the output transformers, unbalanced load conditions, or any other circuit condition, are eliminated. Before describing the regulating and controlling system, an inverter system which generates three-phase alternating potential by first producing two-phase alternating potential will be described so that the relation of the regulating system to the inverter system will be clear. It will be understood, however, that the regulating and controlling system disclosed herein may be used with any unidirectional to two-phase alternating potential, to three-phase alternating potential inverter system, or in any other instance where it is desired to regulate the phase angle between two alternating potentials, and is not to be limited to the specific inverter system described.

The various functions of an inverter system are shown in block diagram in FIG. 1. Circuits which may perform these functions are shown in FIGS. 5 through 13. Because of the interaction of the various circuits, it will be necessary, in some instances, to refer to one or more of the other circuits when describing any one particular circuit.

Figure 5:
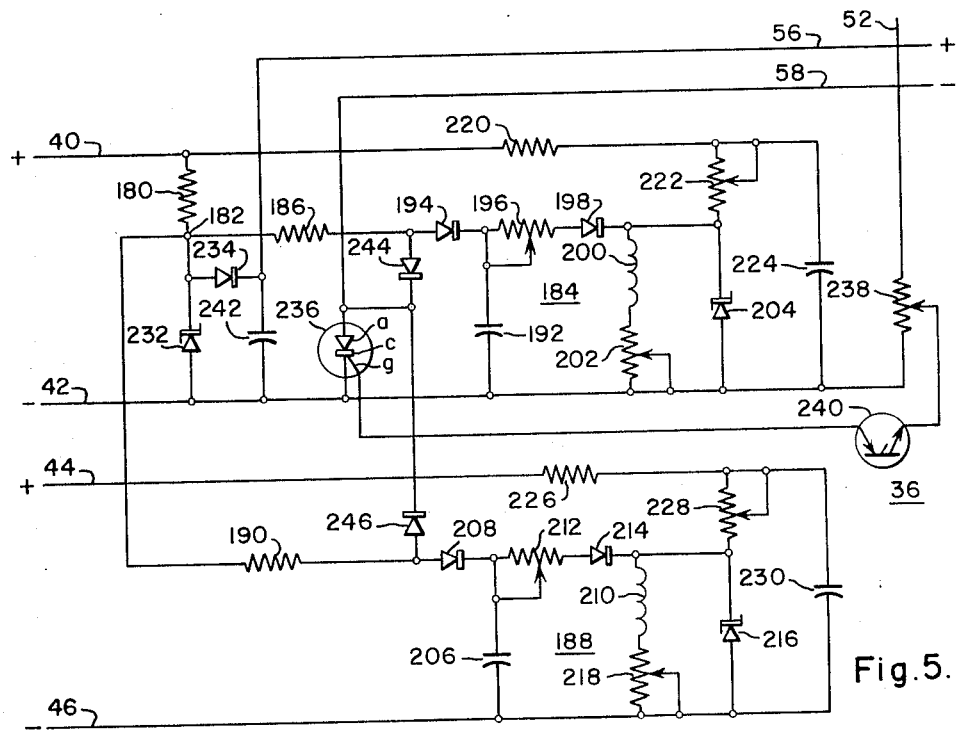
FIG. 5 is a schematic diagram illustrating an automatic start circuit and low voltage power supply that may be used in the inverter system shown in FIG. 1.

The direct current potential shown in FIG. 1 as block 22, may be a battery, or any other source of direct current potential. The direct current potential from source 22 is applied to automatic start circuit and low voltage power supply 36 through conductors 40, 42, 44, and 46. An automatic start circuit and low voltage power supply that may be used is shown in FIG. 5. The circuit shown in FIG. 5 has the function of immediately providing bias voltages to windings on saturable reactors or magnetic amplifiers to provide open loop voltage regulation for the main and teaser inverters 26 and 28, respectively, until closed loop regulation is established by the main and teaser regulators, 48 and 50 respectively, shown in FIG. 1. The circuit shown in FIG. 5 has the further function of providing a low unidirectional voltage for the operation of square wave oscillator and drive circuits 54, with the application of the low unidirectional voltage to the square wave oscillator and drive circuits being delayed until the filter capacitors in the main chopper circuits 32 have charged to a predetermined magnitude.

Figure 8:
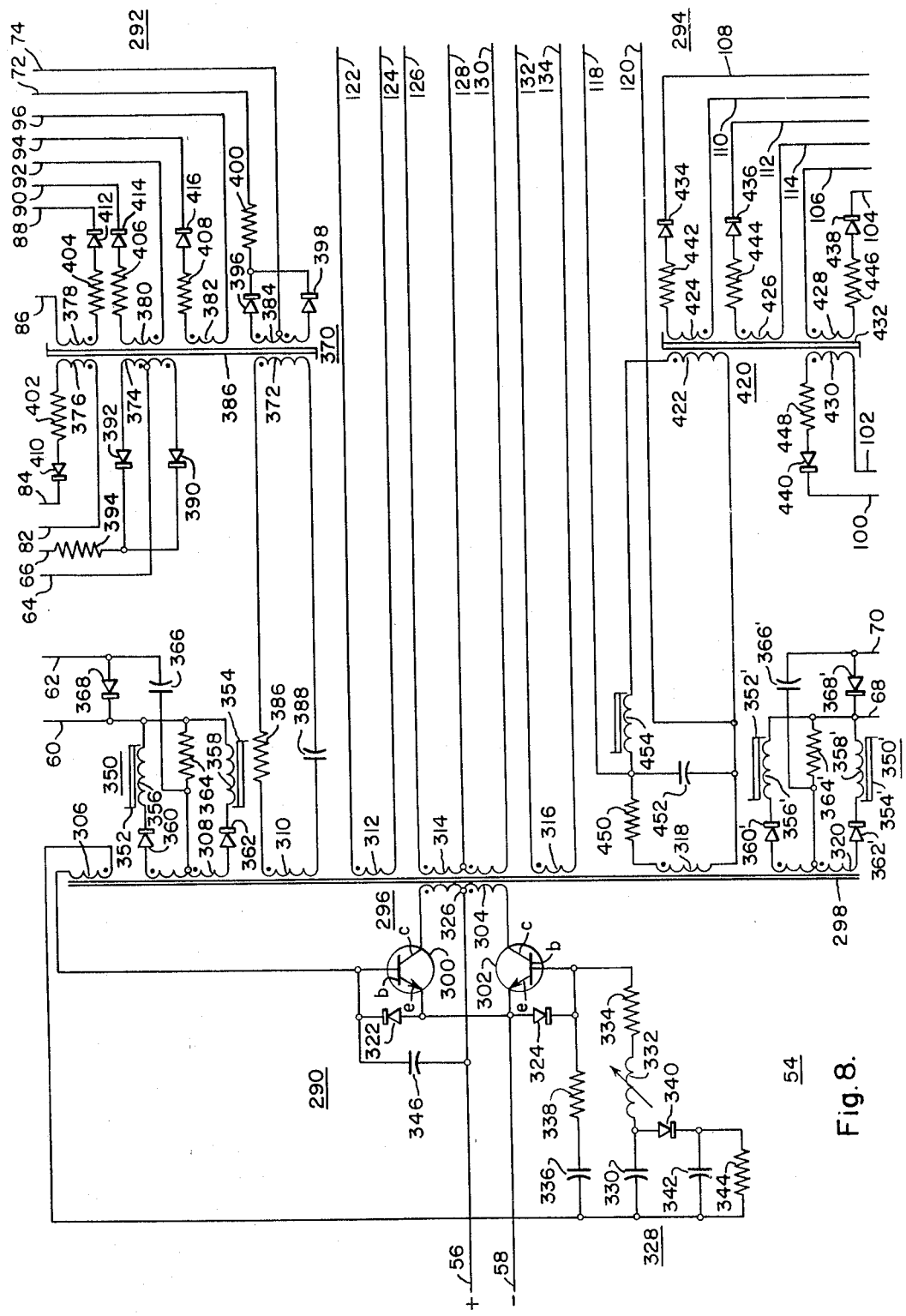
FIG. 8 is a schematic diagram illustrating a square wave oscillator and driver circuits that may be used in the inverter system shown in FIG. 1.

More specifically, when the direct current source voltage 22 is applied to automatic start circuit and low voltage power supply 36, voltage is immediately applied through dropping resistor 180, to junction 182. From junction 182, voltage is also immediately applied to the main inverter pre-bias circuit 184 through current limiting resistor 186 and to the teaser pre-bias circuit 188 through current limiting resistor 190. Voltage is thus applied to capacitor 192 in the main inverter pre-bias circuit 184 through blocking rectifier 194, charging capacitor 192. Voltage is also applied through adjustable resistor 196 and blocking rectifier 198 to saturable reactor control winding 200 and adjustable resistor 202. Adjustable resistor 196 is used to keep above the minimum pre-bias current level, below which the inverter system would not operate. Voltage regulator device 204, which may be a semiconductor rectifier known in the art a Zener diode, provides a substantially constant voltage across the magnetic amplifier control winding 200, with resistor 202 providing an adjustment on the maximum pre-bias current allowed to flow through saturable reactor winding 200, above which the inverter would not operate. Saturable reactor winding 200 is wound on the saturable reactor which controls the main chopper circuits 32 in response to the main regulator 48, and is shown in FIG. 8 as reference numeral 350.

In like manner, the pre-bias circuit 188 of FIG. 5 has voltage applied to capacitor 206 through blocking rectifier 208, and to saturable reactor pre-bias winding 210 through adjustable resistor 212 and blocking rectifier 214. Voltage regulating device 216, which may be a Zener diode, provides a substantially constant voltage across saturable reactor control winding 210, and adjustable resistor 218 provides an adjustment on the pre-bias current allowed to flow through saturable reactor winding 210.

In order to aid the closed loop regulator in applications where the unidirectional potential applied to conductors 40, 42, 44 and 46 may vary over a substantial range, an open loop bias circuit may be provided through windings 200 and 210 which will provide a predetermined magnitude of ampere-turns after the ampere-turns provided by the pre-bias portion of the circuit has terminated. This open loop bias circuit is provided by resistors 220 and 222 and capacitor 224. Zener diodes 204 and 216 maintain the voltages across windings 200 and 210 substantially constant, with the slight increase in voltage across Zener diodes 204 and 216 with inceasing unidirectional voltage of source 22, increasing the ampere-turns of windings 200 and 210 and thus further aiding the closed loop regulator.

A regulated unidirectional voltage is provided across voltage regulating device 232, which may be a Zener diode. This unidirectional voltage is applied to line conductor 56 through blocking rectifier 234. Line conductors 56 and 58 apply the regulated unidirectional voltage to the square wave oscillator and drive circuits 54 shown in FIG. 8. However, it can be seen that voltage is prevented from being applied to the square wave oscillator and drive circuits 54 by a three electrode semiconductor device 236, which may be a controlled rectifier having an anode electrode $a$, cathode electrode $c$ and control or gate electrode $g$. The purpose of controlled rectifier 236 is to prevent the application of unidirectional voltage to the square wave oscillator and drive circuits 54 until the main filter capacitors in the main chopper circuits 32 have reached a predetermined charge voltage. This is accomplished by conductor 52 which connects into the main chopper circuits 32 to be responsive to the charge voltage on the main filter capacitors. When the voltage on the main filter capacitors reaches a certain magnitude, which may be adjusted by resistor 238, a voltage sensitive device 240, which may be a PNPN device such as Shockley diode, changes from a high impedance to a low impedance device, thus applying a pulse of current to the gate electrode $g$ of controlled rectifier 236, switching controlled rectifier 236 from a high impedance state to a low impedance state. When controlled rectifier 236 becomes conductive, the unidirectional voltage produced at terminal 182 is applied to the square wave oscillator and drive circuits 54, with capacitor 242 being a filter capacitor for the unidirectional voltage being applied to conductors 56 and 58. When controlled rectifier 236 becomes conductive, the voltage applied to pre-bias windings 200 and 210 is shunted through controlled rectifier 236 by rectifiers 244 and 246. The voltages on capacitors 192 and 206 then discharge through the pre-bias windings 200 and 210, respectively, to provide open loop bias control current for the regulator saturable reactors during the time the inverter system is building up its output voltage. Once the output voltage of the inverter has stabilized, closed loop regulation is provided by the main and teaser regulators 48 and 50, and pre-bias current is no longer required through pre-bias windings 200 and 210. However, as hereinbefore stated, it may be desirable in certain instances to provide an open loop bias through windings 200 and 210 to aid closed loop regulation, after the ampere-turns provided by the pre-bias portion of the circuit have ceased.

Figure 6:
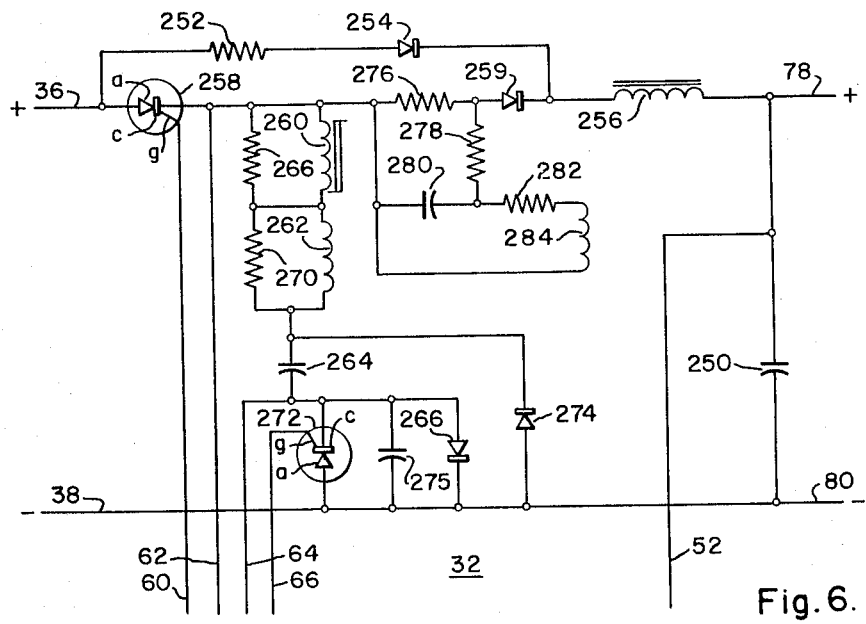
FIG. 6 is a schematic diagram illustrating a unidirectional voltage chopping circuit that may be used in the main inverter shown in FIG. 1.
Figure 7:
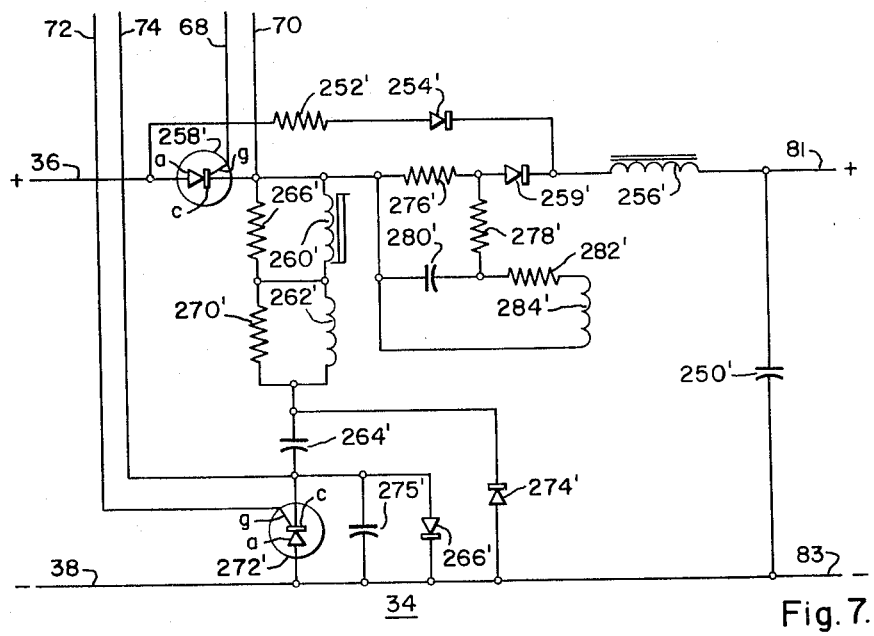
FIG. 7 is a schematic diagram illustrating a unidirectional voltage chopping circuit that may be used in the teaser inverter shown in FIG. 1.

FIGS. 6 and 7 illustrate circuits that may be used to perform the functions of the main and teaser chopper circuits, 32 and 34, respectively. The function of the main and teaser chopper circuits, 32 and 34, is to turn on and off, or "chop," the unidirectional potential provided by direct current potential source 22, in response to the main and teaser regulators, 48 and 50, to provide an average unidirectional voltage for the main and teaser inverter bridge circuits 76 and 92.

When unidirectional potential is first applied to the main chopper circuit 32 through conductors 36 and 38, the main filter capacitor 250 is allowed to charge immediately through resistor 252, rectifier 254, and filter choke 256. Conductor 52, from the automatic start circuit and low voltage power supply shown in FIG. 5, is responsive to the charge voltage on capacitor 250 as hereinbefore explained.

In response to main regulator circuit 48, a three electrode semiconductor switching device 258, which may be a controlled rectifier having an anode electrode $a$, cathode electrode $c$ and control or gate electrode $g$, is switched from a non-conducting to a conducting state, which applies voltage through blocking rectifier 259 to the output conductors 78 and 80. The switching pulse is applied across the gate-cathode junction of controlled rectifier 258 through conductors 60 and 62 from square wave oscillator and drive circuits 54. When controlled rectifier 258 conducts, voltage is applied across the circuit comprising the voltage dividing resistors 266 and 270, inductors 260 and 262, capacitor 264 and rectifier 266. The reactive action of the inductors 260 and 262 and capacitor 264 cause capacitor 264 to be charged to a voltage substantially twice the voltage applied to conductors 36 and 38. The starting time of each unidirectional voltage pulse is varied by the main regulator 48, but the termination of the pulse is fixed. The pulse termination is controlled by the frequency of the square wave oscillator, with the control pulse being applied to three electrode semi-conductor switching device 272, which may be a controlled rectifier having an anode electrode $a$, cathode electrode $c$ and a control electrode $g$. When controlled rectifier 272 switches from a non-conducting to a conducting state, the voltage charge on capacitor 264, which as hereinbefore stated was equal to substantially twice the voltage across conductors 36 and 38, places a reverse voltage across controlled rectifier 258, dropping the current through controlled rectifier 258 to zero and switching it to its non-conducting state. Controlled rectifier 272 conducts until capacitor 264 discharges and it turns off due to insufficient anode to cathode current. Any energy stored in choke inductor 256 is allowed to discharge through diode 274. Capacitor 275 protects controlled rectifier 272 from transient overvoltages.

Unidirectional pulses are produced in the main chopper circuits 32 at a very rapid rate, with the pulse width determining the average unidirectional potential output. The chopped unidirectional voltage is smoothed in the waveform filter network comprising choke coil 256 and capacitor 250.

If it is desired to provide current regulation in the saturable reactor 350 shown in FIG. 8, which controls the starting time of the controlled rectifier 258, a resistor 276 may be connected to provide a voltage drop proportional to the line current. The current produced by the voltage drop may be filtered in resistor 278 and capacitor 280 and applied through current limiting resistor 282 to a winding 284 on the saturable reactor 350.

The teaser chopper circuit 34, shown in FIG. 7, is similar in operation to the main chopper circuit 32, except for the absence of conductor 52, and need not be described in detail. The components in the teaser chopper 34 are given the same reference numerals as like components in the main chopper 32, except a prime mark has been added.

FIG. 8 shows a schematic diagram of a square wave oscillator and drive circuit that may be used. In general, square wave oscillator and drive circuits 54 comprises square wave oscillator 290, main inverter drive circuits 292, and the teaser inverter drive circuits 294.

The square wave oscillator 290 comprises transformer 296 having a plurality of windings 304, 306, 308, 310, 312, 314, 316, 318 and 320 inductively disposed on magnetic core 298, and a pair of three electrode semiconductor devices 300 and 302, which may be NPN junction type transistors each having a base electrode $b$, emitter electrode $e$ and collector electrode $c$. A unidirectional electential for the operation of the square wave oscillator 290 is supplied from automatic start circuit and low voltage power supply 36 through conductors 56 and 58, with the positive conductor 56 being connected to a tap 326 on primary winding 304 of transformer 296, and the negative conductor 58 being connected to the emitter electrodes $e$ of transistors 300 and 302 and to the base electrodes $b$ of transistors 300 and 302 through blocking rectifiers 322 and 324. The collector electrodes $c$ of transistors 300 and 302 are connected to the ends of secondary winding 304 of transformer 296 and the base electrodes $b$ are connected in series circuit relation with feedback coil or winding 306 on transformer 296 and frequency determining circuit 328. The actual frequency at which oscillator 290 will operate is determined by capacitor 330 and inductor 332, with resistor 334 being a current limit. Capacitor 336 and resistor 338 are included to aid the switching of transistors 300 and 302.

The portion of the circuit including blocking rectifier 340, capacitor 342 and bleeder resistor 344 insures that the inverter will work into a capacitive load upon start up. In other words, in order to insure that the current alternation of the inverter output passes through zero before the voltage is switched, capacitor 342 decreases the frequency of operation until charged, or during the first half cycle, thus stretching or increasing the first half cycle of voltage, insuring that the current alternation has passed through zero before the first half cycle of voltage has ended. Blocking rectifier 340 insures that capacitor 342 stays charged after the first voltage half cycle, thus eliminating any further affect of capacitor 342 on the frequency of operation until the next time the inverter is started. Bleeder resistor 344 drains the charge from capacitor 342 when the inverter is turned off so that the capacitor 342 will be ready to "stretch" the first voltage half cycle upon start up.

Capacitor 346 insures that when the unidirectional voltage is applied to the square wave oscillator 290, that transistor 300 will conduct before transistor 302, thus starting the main inverter before the teaser inverter. When transistor 300 is switched to its conducting state, current flows through the collector-emitter junction of transistor 300 and through the upper portion of primary winding 304, thus inducing a square wave voltage into the plurality of windings having a polarity as shown. A current flows in feedback winding 306, and because of the capacitor 330 and inductor 332, this current oscillates at a frequency determined by the magnitude of said capacitor and inductor. This oscillation turns transistors 300 and 302 alternately on and off as the polarity of the oscillation first forward biases one transistor and reverse biases the other, and then reverse biases the previously forward biased transistor and forward biases the previously reverse biased transistor. Thus a square wave voltage having positive and negative alternations is produced in the plurality of secondary windings associated with transformer 296. Secondary windings 308 and 320 of transformer 296 provide the signals which start the main and teaser chopper circuits, 32 and 34 respectively, to conduct. As hereinbefore explained, the time the main and teaser inverters, 32 and 34, start to conduct is adjustable, depending upon the signals from the main and teaser regulating circuits, 48 and 50, respectively. The adjustable starting time of the main chopper circuit 32 is determined by saturable reactor 350, which includes magnetic cores 352 and 354. Saturable reactor 350 includes windings 356 and 358, plus the pre-bias winding 200 shown in FIG. 5, the current regulating winding 284 shown in FIG. 6, and a winding 520 shown in the main regulator circuit FIG. 11. The amount of current or bias in said windings determines when the saturable core reactor 350 saturates. On one half cycle reactor core 352 will saturate and on the next half cycle the reactor core 354 will saturate. When magnetic cores 352 and 354 saturate, a pulse is produced which is applied through conductors 60 and 62 to controlled rectifier 258 shown in FIG. 6. Rectifiers 360 and 362 are for blocking purposes to insure that the proper magnetic core saturates on each voltage half cycle and rectifier 368 protects the cathode-gate junction of controlled rectifier 258 from damage. Resistor 364 allows magnetizing current to flow through windings 356 and 358. Capacitor 366, along with the inherent resistance of windings 356 and 358, provide an RC circuit which provides a current spike instead of a square wave for application to the gate electrode $g$ of controlled rectifier 258.

Figure 12:
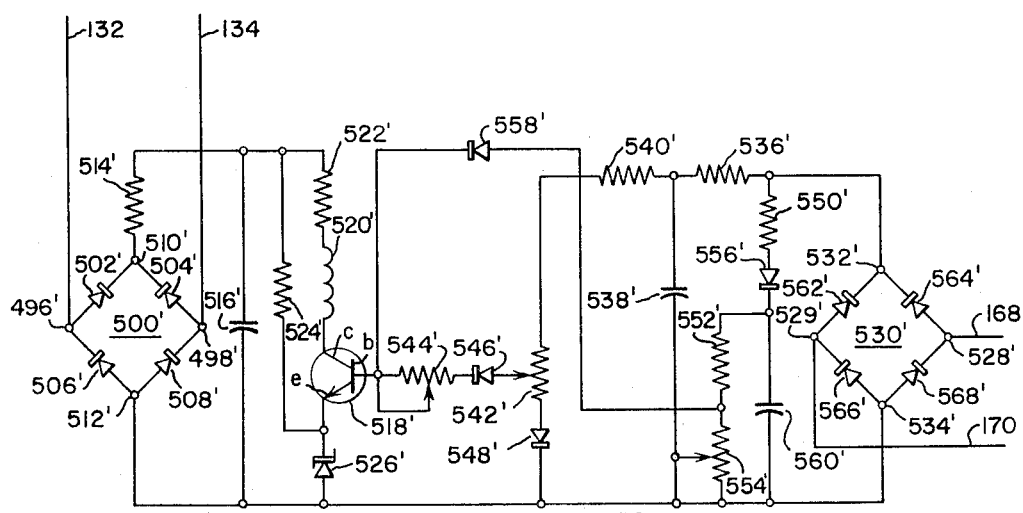
FIG. 12 is a schematic diagram of a voltage regulator, which, in conjunction with the unidirectional voltage chopping circuit shown in FIG. 7, may be used to regulate the magnitude of the output voltage of the teaser inverter shown in FIG. 1.

The circuit associated with the secondary winding 320 of transformer 296 is similar in construction and function to the circuit described relative to the secondary winding 308, with like components being indicated with like reference numerals with the addition of a prime mark. The circuit associated with secondary winding 320 is responsive to the teaser regulator shown in FIG. 12, and controls the starting of the teaser chopper circuit 34 shown in FIG. 7. The pre-bias winding 210 shown in FIG. 5, the current regulating winding 284 shown in FIG. 7 and the teaser regulator winding 520' shown in FIG. 12 are all associated with the saturable core reactor 350' and affect the time it takes saturable reactor 350' to saturate and produce a pulse which controls the starting of the teaser chopper 34 through conductors 68 and 70.

Secondary windings 312, 314 and 316 of transformer 296 provide a source of potential for the operation of the main regulator 48, phase angle regulator 116 and teaser regulator 50, respectively.

As hereinbefore stated, the circuit associated with secondary winding 308 of transformer 296 regulates the magnitude of the unidirectional potential applied to the main inverter bridge circuit 76. Winding 310 controls, through saturating transformer 370, the firing or driving of the main inverter bridge and also controls the fixed stopping time of the conduction of the main and teaser chopper circuits, 32 and 34.

Transformer 370 comprises a primary winding 372 and secondary windings 374, 376, 378, 380, 382 and 384 all inductively disposed on magnetic core 386. Secondary winding 310 of transformer 296 is connected serially with primary winding 372 of transformer 370 through current limiting resistor 386 and capacitor 388. Secondary windings 374 and 384 of transformer 286 provide the function of turning off the main and teaser chopper circuits, 32 and 34 respectively, at fixed times. Blocking rectifiers 390 and 392, associated with secondary winding 374, apply pulses on alternate voltage half cycles to controlled rectifier 272 shown in FIG. 6 through current limiting resistor 394 and conductors 64 and 66, thus stopping the conduction of the main chopper circuit each voltage half cycle. In like manner, blocking rectifiers 396 and 398 each apply pulses on alternate voltage half cycles to controlled rectifier 272', shown in FIG. 7, through current limiting resistor 400 and conductors 72 and 74, thus stopping the conduction of the teaser chopper circuit each voltage half cycle.

Secondary windings 376, 378, 380 and 382 each control the firing of semiconductor devices located in the main inverter bridge circuit 76 through conductors 82, 84, 86, 88, 90, 92, 94 and 96. The main inverter bridge circuits 76 will be described in greater detail hereinafter. Resistors 402, 404, 406 and 408 are current limiting resistors and rectifiers 410, 412, 414 and 416, in conjunction with the respective polarities of the secondary windings 376, 378, 380 and 382, determine which leg of the inverter bridge is rendered conductive.

Secondary winding 318 of transformer 396, in cooperation with saturating transformer 420, provides firing pulses for the teaser inverter bridge circuit 98 through conductors 100, 102, 104, 106, 108, 110, 112, and 114. Teaser inverter bridge circuit 98 will be described in greater detail hereinafter.

Saturating transformer 420 includes primary winding 422 and secondary windings 424, 426, 428 and 430 all inductively disposed on magnetic core 432. The polarities of said windings and the location of blocking rectifiers 434, 436, 438 and 440 determine which leg of the teaser inverter bridge is rendered conductive. Resistors 442, 444, 446 and 448 are for current limit purposes.

The circuit associated with secondary winding 318 of transformer 296 includes resistor 450, capacitor 452 and saturating inductor or reactor 454, and conductors 118 and 120 which are connected to the phase angle regulator 116. The specific cooperation of these components with the phase angle regulator circuit 116 and how the phase angle between the main and teaser inverter output voltages is regulated by controlling the firing time of the teaser inverter bridge circuit 98, will be described in detail when the operation of the phase angle regulator circuit 116 is described.

Figure 9:
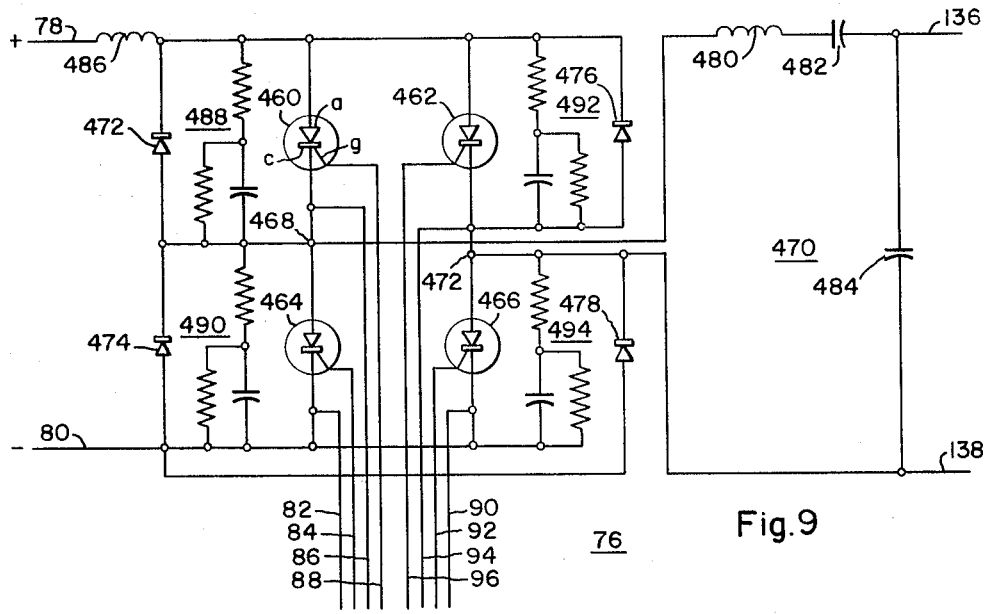
FIG. 9 is a schematic diagram illustrating an inverter bridge that may be used in the main inverter shown in FIG. 1.
Figure 10:
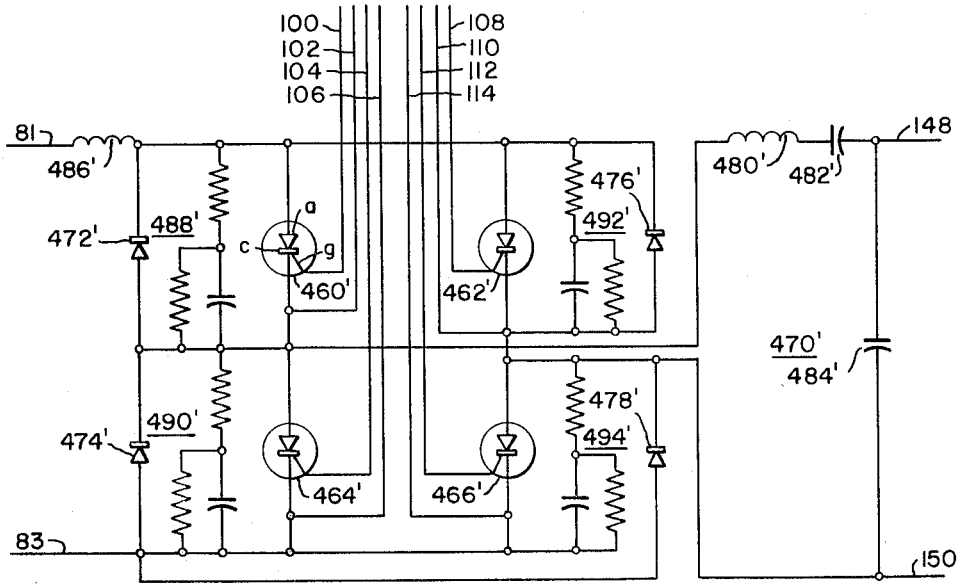
FIG. 10 is a schematic diagram illustrating an inverter bridge that may be used in the teaser inverter shown in FIG. 1.

Main and teaser inverter bridge circuits, 76 and 98, that may be used are shown in FIGS. 9 and 10 respectively. The main inverter bridge circuit 76 comprises four, three electrode semiconductor devices 460, 462, 464 and 466, which may be controlled rectifiers each having an anode electrode $a$, cathode electrode $c$ and a control or gate electrode $g$. A unidirectional voltage from main chopper circuit 32 is applied to the bridge circuit comprising controlled rectifiers 460, 462, 464 and 466, with opposite legs of the bridge circuit being rendered conductive simultaneously. In other words, controlled rectifiers 460 and 466 are first rendered conductive, with a control pulse being applied to controlled rectifier 460 through conductors 86 and 88, and a control pulse being applied to controlled rectifier 466 through conductors 90 and 92. The current thus flows from the positive conductor 78 through controlled rectifier 460 to point 468, through alternating potential filter network 470, through the load circuit from the conductor 136 and back to the bridge through conductor 138 at point 472 and through controlled rectifier 466 to the negative conductor 80. Due to the action of the alternating potential filter network 470, the current through controlled rectifiers 460 and 466 falls to zero, turning controlled rectifiers 460 and 466 off. The reactive energy stored in the alternating potential filter network 470 is allowed to discharge through rectifiers 472 and 478 for a short period before the opposite two legs of the bridge rectifier containing controlled rectifiers 462 and 464 are rendered conductive, in order to prevent controlled rectifiers 464 and 462 from conducting before controlled rectifiers 460 and 466 have ceased to conduct, which would short circuit the line conductors 78 and 80. When controlled rectifiers 462 and 464 are rendered conductive, the current flows from the positive conductor 78, through controlled rectifier 462 to point 472, through the alternating potential filter network 470 and load circuit from conductor 138 back to conductor 136 to point 468 and through controlled rectifier 464 to negative conductor 80. Thus the energy flow through the load has reversed. The reactive energy stored in the alternating potential filter network 470 flows through rectifiers 474 and 476 for a short period before the controlled rectifiers 460 and 466 are fired or rendered conductive to repeat the cycle. The frequency of the inverter bridge is the same as the frequency of the square wave oscillator 290 shown in FIG. 8. The alternating potential filter comprises inductor 480 and capacitors 482 and 484, and performs the function of providing a leading power factor for the inverter bridge to operate into and provides an alternating voltage sine wave for the load circuit connected to conductors 136 and 138. The inductor 486 and the resistor-capacitor networks 488, 490, 492 and 494 comprise "rate of rise" circuits for protecting the controlled rectifiers 460, 462, 464 and 466.

The teaser inverter bridge 98 shown in FIG. 10 has a construction and operation similar to the main inverter bridge circuit 76 shown in FIG. 9, with like components in FIGS. 9 and 10 given like reference numerals with the addition of a prime mark on the teaser inverter bridge components.

Figure 11:
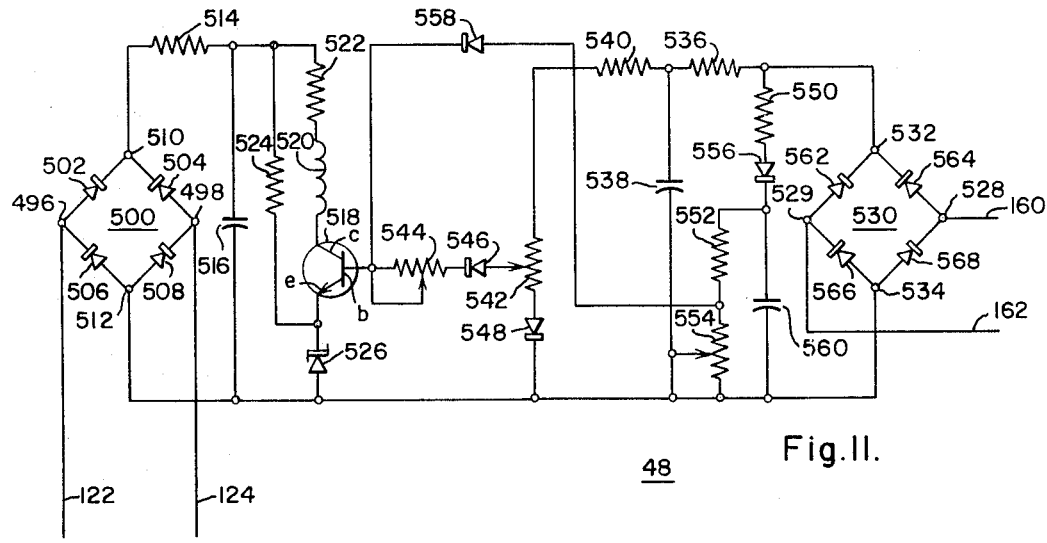
FIG. 11 is a schematic diagram of a voltage regulator, which, in conjunction with the unidirectional voltage chopping circuit shown in FIG. 6, may be used to regulate the magitude of the output voltage of the main inverter shown in FIG. 1.

Main and teaser regulator circuits 48 and 50, that may be used, are shown in FIGS. 11 and 12, respectively. The main regulator circuit 48 has the function of regulating the output voltage of the main inverter 26, and as hereinbefore explained, performs this function by controlling the bias applied to the saturable core reactor 350 shown in FIG. 8, which in turn controls the average time the main chopper circuit 32, shown in FIG. 6, is conducting.

In general, a unidirectional voltage proportional to the output voltage of the main inverter 26 is compared with a fixed reference voltage, and the voltage difference is used to control the impedance of a semiconductor device which is connected in series circuit relation with a source of unidirectional voltage and a control winding of the saturable core reactor 350 shown in FIG. 8. More specifically, a source of alternating potential is obtained from square wave oscillator and drive circuits 54 through conductors 122 and 124 and applied to the input terminals 496 and 498 of full wave bridge rectifier circuit 500, which may have rectifiers 502, 504, 506 and 508 connected in the various legs of the bridge rectifier 500. A unidirectional potential is thus developed across output terminals 510 and 512 which is filtered in resistor 514 and capacitor 516 and applied to a three electrode semiconductor device 518, which may be an NPN junction type transistor 518 having a base electrode $b$, collector electrode $c$ and emitter electrode $e$. By varying the magnitude of the voltage across the base-emitter junction of transistor 518, the impedance of the transistor's collector-emitter circuit can be varied. Therefore, the winding 520 of the saturable core reactor 350 shown in FIG. 8, may be connected in series circuit relation with the collector-emitter circuit of transistor 518, through current limiting resistor 522, and the impedance of the transistor varied in response to the deviation of the voltage to be regulated from a reference voltage. Thus, the current flow through saturable core reactor winding 520 will vary the bias current on the saturable core reactor 350 shown in FIG. 8. The reference voltage may be obtained by applying the unidirectional voltage of the bridge circuit 500 across resistor 524 and a voltage regulating device 526, such as a Zener diode.

A unidirectional voltage proportional to the voltage to be regulated, which in this case is the output voltage $V_M$ of main inverter 26, may be obtained by connecting conductors 160 and 162 from the output of main inverter transformer 140, shown in FIG. 1, to a full wave bridge rectifier 530. Bridge rectifier 530 may comprise rectifiers 562, 564, 566 and 568. The conductors 160 and 162 are connected to input terminals 528 and 529 of bridge rectifier 530 and a unidirectional potential is produced at output terminals 532 and 534. The unidirectional potential produced at terminals 532 and 534 of bridge rectifier 530 is filtered by resistor 536 and capacitor 538 and applied to the base electrode $b$ of transistor 518 through current limiting resistor 540, adjustable resistors 542 and 544 and blocking rectifier 546. The circuit from the adjustable resistor 542 to the negative terminal 534 is completed through blocking rectifier 548. Adjustable resistors 542 and 544 may be used to determine the desired output voltage of the main inverter 26. The difference between the voltage applied to the base electrode $b$ of transistor 518 and the reference voltage at the emitter electrode $e$ of transistor 518 determines the impedance of transistor 518 and hence the magnitude of bias current flowing through saturable core reactor winding 520.

Upon start up, the voltage applied to the base electrode $b$ of transistor 518 is slowed by the action of the filter capacitor 538, thus allowing the output voltage of the main inverter 26 to increase to a high magnitude before the regulator gains control. In order to prevent this voltage overshoot upon start up or limit it to a safe magnitude, the circuit comprising resistors 550, 552 and 554, blocking rectifiers 556 and 558, and capacitor 560, may be used. As the voltage rises on capacitor 560, which charges rapidly compared to the changing rate of capacitor 538, it may be applied to the base electrode $b$ of transistor 518 through blocking rectifier 558, thus placing the regulator in control immediately by clamping the upper voltage limit. When the control voltage through resistors 542 and 544 and rectifier 546 begins to increase, it will take over from the clamping control as it becomes greater in magnitude than the clamping voltage, and will remain in control since under normal conditions, the control voltage applied to the base electrode $b$ of transistor 518 will always be higher than the clamping voltage applied to said base electrode through rectifier 558.

The teaser regulator 50 shown in FIG. 12, which regulates the output voltage of the teaser inverter 28 by controlling the current flow through a winding of the saturable core reactor 350' shown in FIG. 8, is similar in construction to the main voltage regulator 48 shown in FIG. 11. Like components in FIGS. 11 and 12 are designated with like reference numerals, except the reference numerals on the components of the teaser regulator contain a prime mark. For reasons that will be hereinafter explained, the teaser regulator 50 shown in FIG. 12 regulates the output voltage $V_T$ of the teaser transformer 152 by sensing the line voltage $V_B$, which is the vector sum of the teaser inverter voltage $V_T$ and one-half the voltage output of the main inverter $V_M$, and regulates line voltage $V_B$ to be equal to voltage $V_M$.

Figure 13:
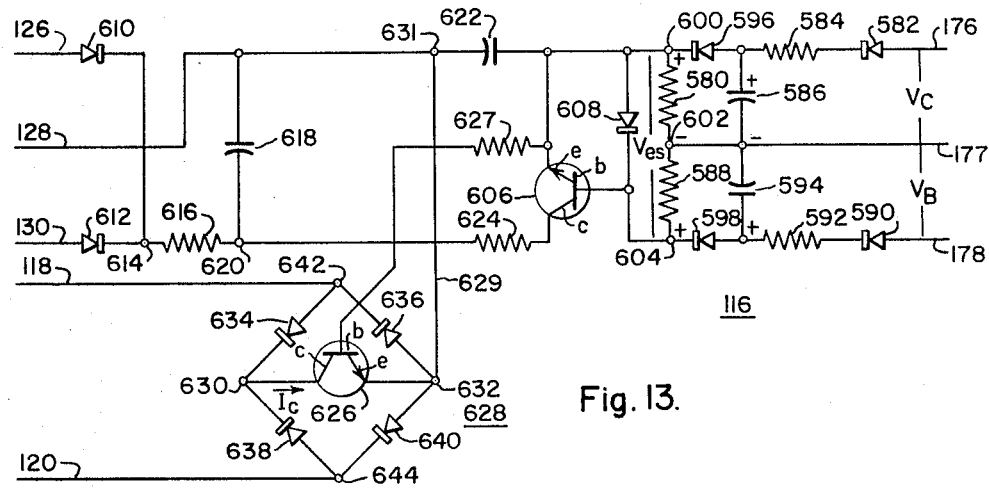
FIG. 13 is a schematic diagram of a phase angle regulator, constructed according to the teachings of this invention, which regulates the phase angle between the output potentials of the main and teaser inverters shown in FIG. 1, to produce a symmetrical three-phase output potential from the inverter system.

A phase angle regulator 116 constructed in accordance with the teachings of this invention is shown in FIG. 13. A function of the phase angle regulator circuit 116 is to regulate the phase angle between the main and teaser inverters 26 and 28, so that the vector produced or hypotenuse line voltages $V_B$ and $V_C$, shown in FIG. 1, are equal to each other. Since the teaser regulator 50 shown in FIG. 12 regulates the output voltage $V_T$ of teaser regulator 28 by regulating line voltage $V_B$ to be equal to the main inverter voltage $V_M$, which is the same voltage as line voltage $V_A$, if line voltage $V_C$ is made equal to line voltage $V_B$ and line voltage $V_B$ equals line voltage $V_A$, all the line voltages will be equal to each other and they will all be one-hundred and twenty degrees out of phase. By regulating the relationship between the teaser inverter voltage $V_T$ and the main inverter voltage $V_M$ by sensing the vector sum of voltage $V_T$ and one-half of voltage $V_M$, and regulating this vector sum to be equal to voltage $V_M$, the chance of error is eliminated that would be possible by sensing voltage $V_T$ directly. In other words, if voltage $V_T$ were to be sensed directly, it would be possible to have an unsymmetrical three-phase output voltage from the inverter system 20, where voltage $V_T$ would be equal to .866 of voltage $V_M$, and line voltage $V_B$ would be equal to line voltage $V_C$, but voltages $V_B$ and $V_C$ would not be equal to voltage $V_M$ or $V_A$.

In general, phase angle regulator 116 senses the line voltages $V_B$ and $V_C$, which are to be kept equal to each other by regulating the phase angle between the output voltages $V_M$ and $V_T$ of the main and teaser inverters, respectively. Any difference between the two voltages produces an error signal which is used to vary the saturation time of a saturable reactor and thus control the point in time when the drive pulses are produced that control the teaser inverter bridge 98.

More specifically, the line voltages $V_B$ and $V_C$ are sensed through conductors 176, 177 and 178, with a unidirectional voltage proportional to the line voltage $V_C$ being developed across resistor 580 and having the polarity shown, due to rectifier 582 and the filter network comprising resistor 584 and capacitor 586. Rectifier 582 may be a semiconductor diode having an anode $a$ and a cathode $c$. In like manner, a unidirectional voltage is developed across resistor 588, having the polarity shown, due to rectifier 590 and the filter network comprising resistor 592 and capacitor 594. Rectifier 590 may be a semiconductor diode having a cathode electrode $c$ and an anode electrode $a$. Rectifiers 596 and 598, which may also be semiconductor diodes, prevent any inaccuracies which might arise from possible interaction of the unidirectional voltages of the two circuits. Thus, a unidirectional voltage proportional to the line voltage $V_C$ is developed across resistor 580, with terminal 600 being positive and terminal 602 being negative, and a unidirectional voltage proportional to line voltage $V_B$ is developed across resistor 588, with terminal 604 being positive and terminal 602 being negative. If line voltage $V_C$ is equal to line voltage $V_B$, there will be no difference in potential across terminals 600 and 604. If line voltage $V_C$ exceeds line voltage $V_B$, a difference in potential will exist across terminals 600 and 604, with terminal 600 being more positive than terminal 604. If line voltage $V_B$ exceeds line voltage $V_C$, there will be a difference in potential across terminals 600 and 604, with terminal 604 being more positive than terminal 600. Further, the difference in potential or error voltage developed across terminals 600 and 604 will be proportional to the amount that one of said line voltages deviates from the other. The error signal, which may be designated as $V_{es}$, developed across terminals 600 and 604 is used to control the phase angle between the output voltages of the main and teaser inverters, as will be hereinafter explained. For purposes of explanation, we will assume error signal $V_{es}$ is positive when terminal 604 is more positive than terminal 600 and negative when terminal 600 is more positive than terminal 604.

The error signal $V_{es}$ is applied to a three electrode semiconductor device, which may be an NPN junction type transistor having a base electrode $b$, emitter electrode $e$ and collector electrode $c$. More specifically, the error signal $V_{es}$ is applied to the base-emitter junction of transistor 606, with rectifier 608 being connected from the base electrode $b$ to the emitter electrode $e$ of transistor 606 to protect the base-emitter junction from damaging voltages.

A unidirectional voltage may be obtained for the operation of transistor 606 by rectifying the alternating voltage obtained from square wave oscillator and drive circuits 54 through conductors 126, 128 and 130. More specifically, rectifiers 610 and 612, which may be semiconductor diodes having an anode electrode $a$ and cathode electrode $c$, are connected in circuit relation with conductors 126 and 130 to provide a unidirectional voltage. Conductors 126 and 130 are connected to the anode electrodes $a$ of rectifiers 610 and 612, respectively, and the cathode electrodes $c$ are connected in common at junction 614. A filter network comprising resistor 616 and capacitor 618 may be used to smooth the unidirectional voltage produced by rectifiers 610 and 612. Resistor 616, in this instance, is connected from junction 614 to junction 620, and capacitor 618 is connected from conductor 128 to junction 620. The unidirectional voltage produced by rectifiers 610 and 612 is applied through capacitor 622 and resistor 624 to the emitter and collector electrodes, respectively, of transistor 606. The magnitude of current flow through transistor 606, due to the unidirectional voltage applied to the collector and emitter electrodes, depends upon the magnitude and polarity of the error signal $V_{es}$. When error signal $V_{es}$ is negative, i.e., terminal 600 is more positive than terminal 604, or error signal $V_{es}$ is zero, transistor 606 will act like an open switch, preventing current flow through its collector-emitter junction. When error signal $V_{es}$ is positive, i.e., terminal 604 is more positive than terminal 600, transistor 606 will be forward biased thus allowing current to flow through its collector-emitter junction.

Transistor 606 is connected to control the impedance of another three electrode semiconductor device, which may be an NPN junction type transistor 626 having a base electrode $b$, emitter electrode $e$ and collector electrode $c$. In order to make the base drive current applied to transistor 626 responsive to the current flow through the collector-emitter junction of transistor 606, the emitter electrode $e$ of transistor 606 is connected to the base electrode $b$ of transistor 626 through resistor 627, and the emitter electrode $e$ of transistor 626 is connected to conductor 128 with a conductor 629 from terminal 632 of bridge rectifier 628 to junction 631.

Transistor 626 is connected across the output terminals 630 and 632 of bridge type rectifier 628, which may have semiconductor diode type rectifiers 634, 636, 638 and 640, connected in the various legs. The input terminals 642 and 644 of bridge rectifier 628 are connected to conductors 118 and 120, respectively, which are connected to square wave oscillator and drive circuits 54 as shown in FIG. 8. The transistor 626 is connected across the output terminals 630 and 632 of bridge rectifier 628 so that the circuit is bilateral. In other words, both the negative and positive alternations of an alternating current produced by an alternating potential applied to the input terminals of bridge rectifier 628 will flow through transistor 626 in the same direction. One half cycle of the alternating current will flow through the conductor 118 to terminal 642, through rectifier 634 to terminal 630, through the collector-emitter junction of transistor 626 to terminal 632, and through rectifier 640 to terminal 644 and the conductor 120. The following half cycle of the alternating current will flow through conductor 120 to terminal 644, through rectifier 638 to terminal 630, through the collector-emitter junction of transistor 626 to terminal 632, and through rectifier 636 to terminal 642 and conductor 118.

When transistor 606 is forward biased with a positive error signal $V_{es}$, current is allowed to flow through the collector-emitter junction of transistor 606, which charges capacitor 622 with a time constant determined by the magnitude of resistor 624, causing more base drive current to be applied to transistor 626. The increased base drive current decreases the impedance of transistor 626 and more current is allowed to flow through the collector-emitter junction of transistor 626. When transistor 606 is reverse biased by a negative error signal $V_{es}$, or when error signal $V_{es}$ is equal to zero, transistor 606 acts like an open switch, preventing current flow through its collector-emitter junction. Capacitor 622 is therefore discharged with a time constant determined by the magnitude of resistor 627. The discharging of capacitor 622 provides a decreasing base drive current for transistor 626, causing the impedance of transistor 626 to increase. When the base drive current applied to transistor 626 decreases to a certain magnitude, transistor 606 will become forward biased and again increase the base drive current applied to transistor 626. Therefore, even though transistor 606 acts in an "on-off" or discontinuous manner, transistor 626 is in continuous control.

In describing how the phase angle regulator 116 shown in FIG. 13 controls the phase angle between the main inverter output voltage $V_M$ and the teaser inverter output voltage $V_T$ to keep line voltages $V_B$ and $V_C$ equal to each other, reference will be made to the square wave oscillator and drive circuit 54 shown in FIG. 8, as well as to FIG. 13. As hereinbefore described, as the magnitude of line voltages $V_C$ and $V_B$ change, the impedance of transistor 626 changes, thus placing a variable impedance across the conductors 118 and 120. Conductors 118 and 120 are connected into the firing or drive circuits 294 shown in FIG. 8, for the teaser inverter bridge 98 shown in FIG. 10. The phase angle between the teaser inverter and main inverter output voltages is changed by varying the switching point in time of the teaser inverter bridge relative to the switching of the main inverter bridge. By connecting transistor 626 to conductors 118 and 120, a voltage dividing network comprising resistor 450, shown in FIG. 8, and transistor 626 is created with respect to the voltage on secondary winding 318 of transformer 296. Saturable reactor 454 exhibits a high impedance for an increment of time which is dependent upon the magnitude of the applied voltage. In other words, saturable reactor 454 has a constant volt-second characteristic before saturation is reached. When the voltage applied to saturable reactor 454 is lower, the time to reach saturation is longer, and when the voltage applied to saturable reactor 454 is increased, the time to reach saturation of saturable reactor 454 is shorter. Therefore, since voltage will not be applied to winding 422 of the pulse producing transformer 420 until saturable reactor 454 saturates, and the impedance of transistor 626 determined when the saturating reactor 454 saturates by controlling the magnitude of the voltage applied to saturable reactor 454, it can be seen that the error signal $V_{es}$ controls the point in time that the teaser inverter bridge is switched with respect to the switching of the main inverter bridge.

More specifically, the collector current $I_C$ flowing through the collector-emitter junction of transistor 626 produces a voltage drop across resistor 450. Thus, the voltage applied by secondary winding 318 to saturable reactor 454 is reduced by the amount of the voltage drop across resistor 450 due to the current $I_C$. Therefore, the magnitude of the current $I_C$ determines the magnitude of the voltage applied to saturable reactor 454 and hence controls the time when saturable reactor 454 reaches saturation. When saturable reactor 454 reaches saturation, the voltage sustained by saturable reactor 454 up to that point is applied to the primary winding 422 of transformer 420, causing a pulse to be applied to the teaser inverter bridge 98 through the secondary windings 424, 426, 428 and 430 of transformer 420. Saturable reactor 454 and transformer 420 are so designed that when a voltage is applied to the series combination of the two components, substantially all of the voltage will be supported by the saturable reactor 454 until saturable reactor 454 saturates, at which time substantially all of the voltage will be supported by the transformer 420.

Since firing or drive pulses can be delivered to the teaser inverter bridge 98 only after saturable reactor 454 saturates, and the time required to saturate saturable reactor 454 is controlled by the magnitude of the collector current $I_C$ of transistor 626, it is seen that the magnitude of the base drive current applied to transistor 626 controls the phase angle between the main inverter output voltage $V_M$ and the teaser inverter output voltage $V_T$.

Capacitor 452 is connected from the junction between resistor 450 and saturable reactor 454 to one side of secondary winding 318 of transformer 296 to extend the return time of the operating point of transformer 420 from the saturation position to the remnant flux position it occupies during the high impedance condition of saturable reactor 454, thus eliminating undesirable pulses in the control circuits of the teaser inverter bridge circuit 98.

Upon start up, transistor 626 is not conducting, so saturable reactor 454 is designed to saturate and turn on one side of the teaser inverter bridge circuit 98 approximately eighty degrees after one side of the main inverter bridge has been turned on. After the inverter has been started, an error signal $V_{es}$ will be generated anytime the line voltage $V_C$ is not equal to line voltage $V_B$. This error signal $V_{es}$ will be positive when the teaser inverter voltage output lags the main inverter voltage output by less than ninety degrees, forward biasing transistor 606, charging capacitor 622 and increasing the base drive current of transistor 626. The current through transistor 626 is allowed to increase, increasing the voltage drop across resistor 450 and decreasing the voltage applied to saturable reactor 454. The decreased voltage applied to saturable reactor 454 increases the time it takes to drive the saturable reactor 454 to saturation, therefore increasing the point in time between the switching of the main inverter bridge and the switching of the teaser inverter bridge, thus increasing the angle that teaser inverter output voltage $V_T$ lags the main inverter output voltage $V_M$. When the phase angle increases to a point where the line voltage $V_C$ and line voltage $V_B$ are no longer equal, transistor 606 is no longer forward biased, as the control signal $V_{es}$ has fallen to zero or has become negative. Transistor 606 ceases to conduct current through its collector-emitter junction and capacitor 622 discharges through resistor 627, providing a decreasing base drive current to transistor 626. As the base drive current of transistor 626 decreases, the current through the collector-emitter junction of transistor 626 decreases, decreasing the voltage drop across resistor 450 and increasing the voltage applied to the saturable reactor 454. Saturable reactor 454 thus reaches saturation in a shorter time, decreasing the amount of time between the switching of the main inverter bridge circuit and the teaser inverter bridge circuit. This decreases the phase angle between the output voltages of the main and teaser inverters to the point where line voltage $V_C$ is no longer equal to the line voltage $V_B$. A positive error signal $V_{es}$ is again produced at terminals 600 and 604, thus forward biasing transistor 606 into conduction, capacitor 622 thus charges, and the base drive current applied to transistor 626 is increased. The cycle is thus repeated, with transistor 606 turning on and off and transistor 626 remaining in continuously control with a continuously increasing and decreasing base drive current.

Thus, it can be seen that the regulating system disclosed herein produces a three-phase symmetrical output voltage wherein the magnitude of the various line voltages and the phase angle between them can be held to very close tolerances regardless of the magnitude of the load applied to the inverter or the unbalance of the load. Further, the symmetrical output voltage is not affected by phase angle shifts in the filter networks or output transformers, since the phase angle regulator 116 regulates the phase angle between the main and teaser inverter output voltages to maintain the line voltages $V_C$ and $V_B$ equal to each other. Since the line voltage $V_A$ is regulated by the main regulator 48, and the line voltage $V_B$ is regulated to be equal to line voltage $V_A$ by teaser inverter regulator 50, and the line voltages $V_B$ and $V_C$ are regulated in the phase angle regulator 116 to be equal to each other, line voltages $V_A$, $V_B$ and $V_C$ are all equal to each other in magnitude and one-hundred and twenty degrees out of phase with each other.

In the operation of the complete inverter system shown in FIG. 1, the main regulator 48 senses the output voltage $V_M$ of the main inverter 26 and regulates it to the desired magnitude. Inverter output voltage $V_M$ is the same as the output line voltage $V_A$. The teaser regulator 50 regulates the output voltage $V_T$ of the teaser regulator to the proper relationship with respect to the output voltage $V_M$ of the main inverter by sensing the line voltage $V_B$ and regulating the magnitude of voltage $V_T$ so that line voltage $V_B$ equals voltage $V_M$. By regulating line voltage $V_B$ to be equal to the main inverter output voltage $V_M$, the proper relationship between voltages $V_M$ and $V_T$ is established without the chance of error that would be introduced by unbalanced loads if teaser regulator 50 were to regulate the teaser output voltage $V_T$ by sensing voltage $V_T$ directly. Therefore, we have established line voltage $V_B$ equal to line voltage $V_A$. The phase angle regulator 116 insures a symmetrical output by regulating the phase angle between the main inverter output voltage $V_M$ and the teaser output voltage $V_T$ so that the line voltages $V_C$ and $V_B$ are equal to each other. Therefore, line voltages $V_A$, $V_B$ and $V_C$ are all equal to each other in magnitude which forms an equilateral triangle, with the line voltages one hundred and twenty degrees out of phase with each other.

Figure 14:
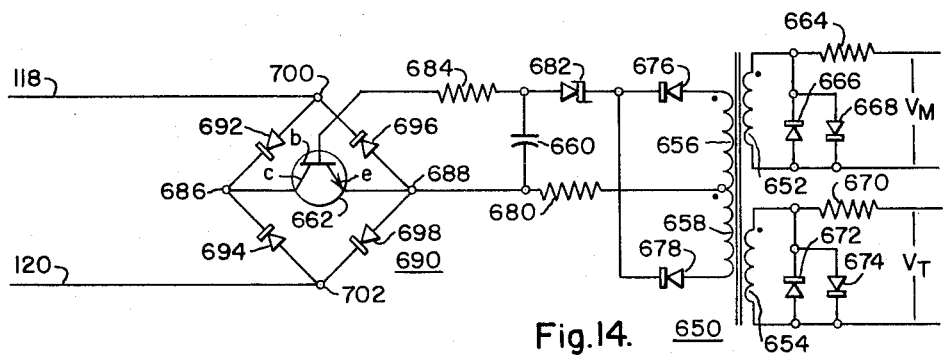
FIG. 14 is a schematic diagram illustrating another embodiment of the invention.

When the load to be served by an inverter system will always be a balanced one, it is possible to modify the phase angle regulator shown in FIG. 13. It will be remembered that when the load is balanced, it is possible to merely maintain the output voltages of the main and teaser inverters in quadrature, and if the relationship is maintained whereby the teaser inverter output voltage is equal to .866 of the main inverter output voltage, a symmetrical voltage output will be obtained. A phase shift regulator circuit which produces an error signal when the phase angle between the output voltages of the main and teaser inverters is not ninety degrees and produces a correcting action to return the angle to ninety degrees is shown in FIG. 14. The phase angle regulator shown in FIG. 14 compares the voltage output $V_M$ of the main inverter regulator 26 with the voltage output $V_T$ of the teaser inverter regulator 28 in transformer 650, with the number of turns in the primary and secondary windings 652, 654, 656 and 658 being chosen to produce a predetermined average unidirectional voltage across capacitor 660 when voltage $V_T$ is equal to .866 $V_M$ and lagging voltage $V_M$ by ninety degrees. Since voltage $V_M$ is regulated by the main voltage regulator 48, and inverter voltage $V_T$ is regulated in the teaser regulator 50 to be equal to .866 of the voltage $V_M$, any change in the predetermined average unidirectional potential developed across capacitor 660 will be due to a change in the phase angle between the voltages $V_T$ and $V_M$ from ninety degrees. As the phase angle decreases from ninety degrees, voltages $V_T$ and $V_M$ will be more in phase with less cancellation of signals in winding 656 and 658, with the result that the signal, as rectified by rectifiers 676 and 678 and filtered by resistor 680 and capacitor 660 is increased. This error signal applied to a three electrode device, which may be a NPN junction type transistor 662 having a base electrode $b$, collector electrode $c$ and emitter electrode $e$, will correct the angle between the voltages $V_M$ and $V_T$ back to ninety degrees. More particularly, the output voltage $V_M$ of the main inverter 26 is applied to winding 652 of transformer 650 through current limiting resistor 664. Rectifiers 666 and 668 act as clippers on the voltage $V_M$, applying substantially a square wave voltage to winding 652.

In like manner, the output voltage $V_T$ of the teaser inverter 28 is applied to winding 654 of transformer 650 through current limiting resistor 670, with rectifiers 672 and 674 clipping the voltage $V_T$ to substantially a square wave. The clipped voltages $V_M$ and $V_T$ are compared in secondary winding 656 and 658, with some portions of the signals adding and some portions cancelling, to produce square waves having a width or duration proportional to the phase angle between voltages $V_T$ and $V_M$. These square waves are rectified in rectifiers 676 and 678 and applied through resistor 680 and rectifier 682 to capacitor 660 to provide an average unidirectional potential proportional to the phase angle between voltages $V_T$ and $V_M$. Rectifier 682 is preferably a Zener diode and prevents operation of the regulator until the teaser inverter starts to operate. Resistor 680 and capacitor 660 filter the unidirectional error signal and apply it through resistor 684 to the base-emitter junction of transistor 662. Transistor 662 is connected across the terminals 686 and 688 of bridge rectifier 690, which may have rectifiers 692, 694, 696 and 698 connected in the various legs of the bridge circuit. Terminals 700 and 702 are connected to conductors 118 and 120 which are connected to the square wave oscillator and drive circuits 54 and control the phase angle between the main inverter output voltage $V_M$ and the teaser inverter output voltage $V_T$ in a manner hereinbefore described when describing the operation of FIG. 13.

Figure 15:
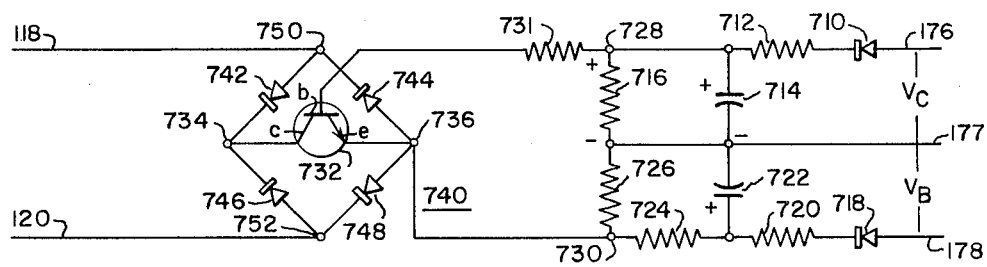
FIG. 15 is a schematic diagram illustrating another embodiment of the invention.

Another modification of the phase angle regulator 116 which may be used when the load to be connected to the inverter system will always be balanced is shown in FIG. 15. The circuit shown in FIG. 15 is very similar to the phase angle regulator shown in FIG. 13, except only one transistor is used and a steady state error signal is always present.

In the circuit shown in FIG. 15, the phase angle between the output voltages $V_M$ and $V_T$ is regulated to maintain line voltages $V_C$ and $V_B$ equal in magnitude to each other. Line voltage $V_C$ is applied to conductors 176 and 177 and rectified in rectifier 710, filtered in the filter network comprising resistor 712 and capacitor 714 and applied across resistor 716 with the polarity shown. In like manner, line voltage $V_B$ is applied to conductors 177 and 178, rectified in rectifier 718, filtered in the filter network comprising resistor 720 and capacitor 722, and applied through resistor 724 to resistor 726. Any difference in the magnitudes of the line voltages $V_C$ and $V_B$ appear across resistors 716 and 726 and terminals 728 and 730 as an error signal. This error signal is applied through resistor 731 to a three electrode semiconductor device which may be a NPN junction type transistor 732, having a base electrode $b$, collector electrode $c$ and emitter electrode $e$. Terminal 728 is connected to the base electrode $b$ of transistor 732 through resistor 731 and terminal 730 is applied to the emitter electrode $e$ of transistor 732. In order to form a bilateral circuit, transistor 732 is connected across terminals 734 and 736 of bridge rectifier 740. Bridge rectifier 740 may have rectifiers 742, 744, 746 and 748 connected in the various legs of the bridge rectifier 740. Terminals 750 and 752 of bridge rectifier 740 are connected to conductors 118 and 120, and conductors 118 and 120, are connected to the square wave oscillator and drive circuits 54 and regulate the phase angle between the output voltages $V_M$ and $V_T$ of the main and teaser inverters respectively in the same manner as hereinbefore described relative to the phase angle regulator shown in FIG. 13.

The regulating system disclosed herein has several advantages. Its high efficiency allows it to operate upon only a few watts of power and it requires only a few inexpensive components. Further, its performance is such as to allow the use of less expensive components in the associated inverter system. For example, in conventional polyphase inverters it is necessary to manufacture the output filters for each inverter phase to very close tolerances so that they are as identical as possible, in an attempt to equalize the phase shifts through them. Using the regulating system disclosed herein, the high cost of manufacturing these filters to exacting tolerances may be eliminated. Further, the change in circuit components due to aging or other conditions will not adversely affect the symmetrical output voltage of an inverter system using the regulator system disclosed, since any phase shift occurring in the inverter components is compensated for at the output of the inverter to produce a symmetrical polyphase output voltage.

It will, therefore, be apparent that there has been disclosed a regulating system for inverter apparatus that insures a symmetrical polyphase output voltage under balanced or unbalanced load conditions, and is not adversely affected by phase shifts occurring in the various components of the inverter system.

Since numerous changes may be made in the above-described apparatus and different embodiments of the invention may be made without departing from the spirit thereof, it is intended that all matter contained in the foregoing description or shown in the accompanying drawings shall be interpreted as illustrative, and not in a limiting sense.

We claim as our invention:

1. An electric circuit comprising first means producing first and second alternating phase potentials, second means connected in circuit relation with said first means producing first, second and third alternating line potentials, said first alternating line potential being the same as said first alternating phase potential, first regulating means maintaining said first alternating phase potential substantially constant, second regulating means sensing the second line potential and maintaining said second line potential substantially equal to said first line potential by regulating the magnitude of said second alternating phase potential, third means connected in circuit relation with said second means rectifying said second and third alternating line potentials, fourth means connected in circuit relation with said third means producing a signal responsive to any difference in the magnitudes of said rectified second and third alternating line potentials, fifth means connected in circuit relation with said first and fourth means regulating the phase angle between said first and second alternating phase potentials in response to said signal and maintaining said second and third alternating line potentials substantially equal to each other.

2. An electric circuit for producing an impedance whose magnitude is responsive to the difference between the magnitudes of first and second alternating potentials, comprising first means producing first and second unidirectional potentials responsive to said first and second alternating potentials, second means connected in circuit relation with said first means producing an error signal responsive to any difference between the magnitudes of said first and second unidirectional potentials, first semiconductor means connected in circuit relation with said second means, said first semiconductor means switching between its conducting and non-conducting states in response to said error signal, the impedance of said first semiconductor means while in its conducting state also being responsive to said error signal, second semiconductor means connected in circuit relation with said first semiconductor means, energy storage means connected in circuit relation with said first and second semiconductor means, said first semiconductor means controlling the impedance of said second semiconductor means while said first semiconductor means is in its conducting state, said energy storage means controlling the impedance of said second semiconductor means while said first semiconductor means is in its non-conducting state.

3. An electric circuit for producing an impedance whose magnitude is responsive to the difference in the magnitudes of first and second alternating potentials comprising first means producing first and second unidirectional potentials in response to said first and second alternating potentials, second means connected in circuit relation with said first means producing an error signal responsive to any difference between the magnitudes of said first and second unidirectional potentials, first semiconductor means having main electrodes and a control electrode, second semiconductor means having main electrodes and a control electrode, energy storage means, said error signal being applied to the control electrode of said first semiconductor means, said first semiconductor means allowing a current to flow between its main electrodes when said signal is of one polarity and preventing current flow between its main electrodes when said signal is of opposite polarity, said first semiconductor means being connected in circuit relation with said second semiconductor means and said energy storage means, said energy storage means charging when said first semiconductor means is allowing current to flow between its main electrodes and discharging when said first semiconductor means is preventing current flow between its main electrodes, said first semiconductor means controlling the impedance between the main electrodes of said second semiconductor means while said first semiconductor means is allowing current to flow between its main electrodes, said energy storage means controlling the impedance between the main electrodes of said second semiconductor means while said first semiconductor means is preventing current flow between its main electrodes.

4. An electrical inverter system comprising means producing first and second alternating phase potentials, transformer means connected in circuit relation with said first and second alternating phase potentials producing first, second and third alternating line potentials, said first alternating line potential being the same as said first alternating phase potential, first regulating means connected in circuit relation with the means producing said first alternating phase potential and maintaining the magnitude of said first alternating phase potential substantially constant, second regulating means connected in circuit relation with the second or third alternating line potential and the means producing said second alternating phase maintaining the magnitude of said second or third alternating line potential substantially equal to the first alternating phase potential by regulating the magnitude of said second alternating phase potential, rectifier means connected in circuit relation with said transformer means producing first and second unidirectional potentials in response to said second and third alternating line potentials, impedance means connected in ciricuit relation with said rectifier means producing an error signal responsive to the difference between the magnitudes of said first and second unidirectional potentials, first transistor means having base, collector and emitter electrodes connected in circuit relation with said impedance means, second transistor means having base, collector and emitter electrodes connected in circuit relation with said first transistor means, energy storage means connected in circuit relation with said first and second transistor means, the error signal produced by said impedance means being applied to the base-emitter electrodes of said first transistor means, said first transistor means being conductive when said error signal is of one polarity and non-conductive when said error signal is zero and when said error signal is of opposite polarity, said energy storage means charging when said first transistor means is conducting and discharging when said first transistor means is non-conducting, said first transistor means controlling the impedance between the collector and emitter electrodes of said second transistor means while said first transistor means is conducting, said energy storage means controlling the impedance between the collector and emitter electrodes of said second transistor means while said first transistor means is non-conductive, and means connected in circuit relation with said second transistor means regulating the phase angle between said first and second alternating phase potentials to maintain the magnitudes of said second and third alternating line potentials substantially equal to each other.

5. An electrical inverter system comprising means producing first and second alternating phase potentials, transformer means connected in circuit relation with said first and second alternating phase potentials producing first, second and third alternating line potentials, said first alternating line potential being the same as said first alternating phase potential, first regulating means connected in circuit relation with the means producing said first alternating phase potential and maintaining the magnitude of said first alternating phase potential substantially constant, second regulating means connected in circuit relation with the means producing said second alternating phase potential sensing the magnitude of said second alternating line potential and maintaining the magnitude of said second alternating line potential substantially equal to said first alternating phase potential by regulating the magnitude of said second alternating phase potential, rectifier means connected in circuit relation with said second and third alternating line potentials producing a first and second unidirectional potential, impedance means connected in circuit relation with said rectifier means producing an error signal responsive to the difference between the magnitudes of said first and second unidirectional potentials, first and second transistor means, capacitor means, said error signal being applied to said first transistor means, said first transistor means being conductive when said error signal is of one polarity and non-conductive when said error signal is zero and when said error signal is of opposite polarity, said first transistor means being connected in circuit relation with said second transistor means and said capacitor means, said capacitor means charging when said first transistor means is conducting and discharging when said first transistor means is non-conducting, said first transistor means controlling the impedance of said second transistor means while said first transistor means is conducting, said capacitor means controlling the impedance of said second transistor means while said first transistor means is non-conducting, saturable reactor means connected in circuit relation with the means producing said second alternating phase potential, the saturation time of said saturable reactor means determining the phase angle between said first and second alternating phase potentials, oscillator means producing an alternating potential on a predetermined magnitude and frequency, voltage dividing means including said second transistor means connected in circuit relation with said oscillator means and said saturable reactor means, said voltage dividing means applying a portion of the potential produced by said oscillator means to said saturable reactor means responsive to the impedance of said second transistor means thereby regulating the phase angle between said first and second alternating phase potentials to maintain the magnitudes of said second and third alternating line potentials substantially equal to each other.

6. A phase angle regulator for controlling the phase angle between a first and second alternating phase voltage produced by an inverter system comprising wave clipping means changing the waveforms of said first and second alternating potential phase voltages into substantially square wave configurations, transformer means having first and second input windings and an output winding, said first alternating phase voltage being connected in circuit relation with said first input winding, said second alternating phase voltage being connected in circuit relation with said second input winding, said output winding producing voltage pulses having a duration responsive to the phase angle between said first and second alternating potentials, rectifier means connected in circuit relation with said output winding and producing a unidirectional error signal having a magnitude responsive to the duration of said voltage pulses, means including a transistor connected in circuit relation with said output winding regulating the phase angle between said first and second alternating phase voltages.

7. An electrical inverter system comprising first means producing a first alternating phase potential, second means producing a second alternating phase potential, third means changing the waveforms of said first and second alternating potentials into substantially square wave configurations, fourth means including a transformer having first and second input windings and an output winding, said first alternating potential being connected in circuit relation with the first input winding of said transformer, said second alternating potential being connected in circuit relation with the second input winding of said transformer, the output winding of said transformer producing voltage pulses having a duration responsive to the phase angle between said first and second alternating phase potentials, fifth means including rectifier means connected in circuit relation with said output winding and producing a unidirectional error signal having a magnitude responsive to the duration of said voltage pulses, sixth means including a saturable reactor connected in circuit relation with said second means, the saturation time of said saturable reactor determining the phase angle between said first and second alternating phase potentials, oscillator means producing an alternating potential of a predetermined magnitude and frequency, voltage dividing means including a transistor connected in circuit relation with said saturable reactor and said oscillator means, said transistor being connected in circuit relation with said unidirectional error signal, said transistor controlling the portion of the potential produced by said oscillator means that is applied to said saturable reactor and thereby controlling the saturation time of said saturable reactor.

8. An electrical inverter system comprising first means producing a first alternating phase potential, second means producing a second alternating phase potential lagging said first alternating phase potential by substantially ninety electrical degrees, third means changing the waveform of said first and second alternating potentials into substantially square wave configurations, fourth means including a transformer having first and second input windings and an output winding, said first alternating potential being connected in circuit relation with the first input winding of said transformer, said second alternating potential being connected in circuit relation with the second input winding of said transformer, the output winding of said transformer producing voltage pulses having a duration responsive to the phase angle between said first and second alternating phase potentials, fifth means including rectifier means connected in circuit relation with said output winding and producing a unidirectional error signal having a magnitude responsive to the duration of said voltage pulses, sixth means including a saturable reactor connected in circuit relation with said second means, the saturation time of said saturable reactor determining the phase angle between said first and second alternating phase potentials, oscillator means producing an alternating potential of a predetermined magnitude and frequency, voltage dividing means including a transistor connected in circuit relation with said saturable reactor and said oscillator means, said transistor being connected in circuit relation with said unidirectional error signal, said transistor controlling the portion of the potential produced by said oscillator means that is applied to said saturable reactor and thereby controlling the saturation time of said saturable reactor to maintain the phase angle between said first and second alternating phase potentials at substantially ninety electrical degrees.

References Cited by the Examiner

UNITED STATES PATENTS

| 2,575,600 | 11/1951 | Smith | 323—106 |
| 2,643,358 | 6/1953 | Murray | 321—5 |
| 3,010,062 | 11/1961 | Van Emden | 321—45 X |
| 3,098,964 | 7/1963 | Hetzler | 322—28 |

FOREIGN PATENTS

| 918,783 | 2/1963 | Great Britain. |
| 625,839 | 8/1961 | Canada. |

OTHER REFERENCES

General Electric Controlled Rectifier Manual, 1961, p. 162.

JOHN F. COUCH, *Primary Examiner.*

W. H. BEHA, *Assistant Examiner.*